(No Model.)

R. M. HUNTER.
ELECTRIC RAILWAY.

No. 384,910. Patented June 19, 1888.

Attests:

Inventor:

N. PETERS, Photo-Lithographer, Washington, D. C.

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 384,910, dated June 19, 1888.

Original application filed June 10, 1887, Serial No. 240,880. Divided and this application filed April 26, 1888. Serial No. 271,923. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form part thereof.

My invention contemplates the arrangement of secondary or other batteries in a car especially adapted to traction purposes; and it consists, essentially, in placing the batteries in compartments arranged upon each side of the vehicle forming a passage-way longitudinally between them; and, further, in so locating the batteries that they shall come over the wheels, whereby the weight shall be in or substantially in the plane of the wheels, so as to avoid all excessive strains upon the car or vehicle frame.

My object also consists in providing a door to said compartments and suitable contacts controlled by the door, whereby when the door is closed it will automatically couple up the battery-cells in circuit.

I do not limit myself to the details of construction shown.

This application is a division of my application No. 240,880, of 1887, and any matters herein shown but not claimed form subject-matter of said application.

Figure 1:
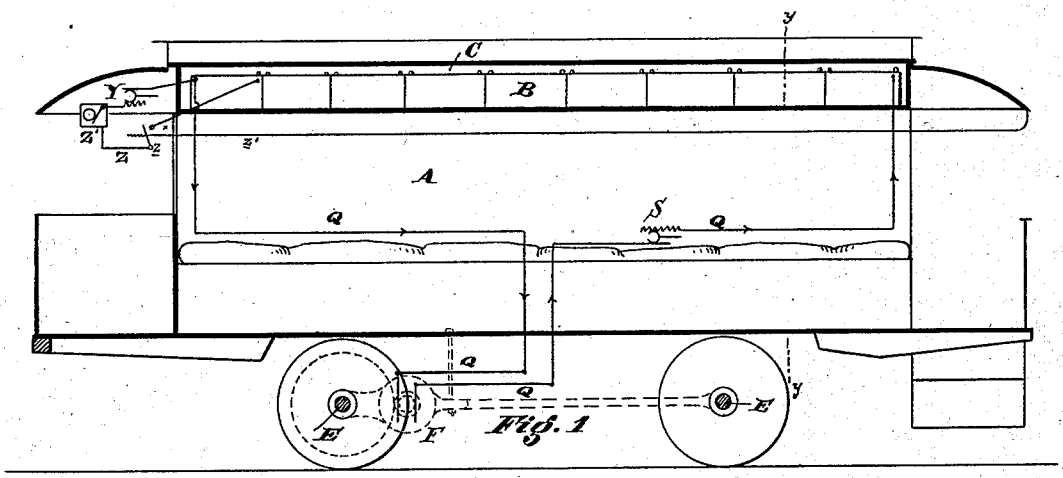
Figures 2, 3, 4:
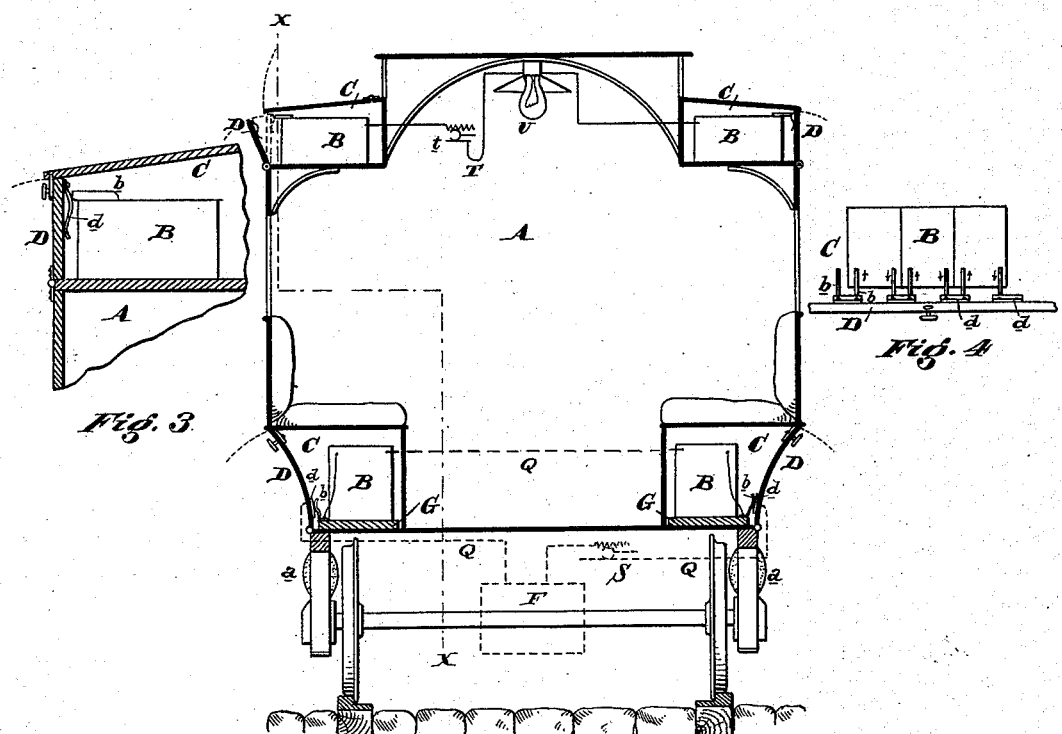
Figure 3:
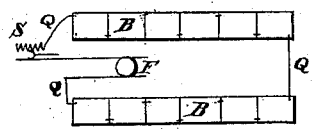

In the drawings, Figure 1 is a sectional side elevation on line $x\,x$ of a street-car embodying my invention. Fig. 2 is a cross-section of same on line $y\,y$. Fig. 3 is an enlarged view of the upper right hand corner of Fig. 2, showing the method of coupling up the secondary battery-cells by closing the door to the compartment. Fig. 4 is a plan view of same, and Fig. 5 is a diagram illustrating the connection of the batteries and motor.

A is the car-body, and may be supported upon the axles by means of springs $a$ in the ordinary way.

C are compartments upon the car, on each side, and provided with doors D. These doors may be hinged to the car-body, if desired, and are preferably so, but not necessarily.

B are the secondary batteries, which are placed within the compartment C and coupled up in any suitable manner. As shown, the batteries have their terminals brought to the front, as at $b$, and the doors D are provided with contact-strips $d$, preferably formed of springs which, when the door is closed, couple up the different cells of the battery. (See Figs. 3 and 4.)

The secondary or other battery is supported by the car-body, and is therefore on springs, and can ride easily over the road and without spilling its solution despite its large weight, while the motor is preferably supported positively by the axles and independent of the car-body.

A feature of locating the batteries on each side is to bring them directly above the wheels, whereby the downward thrust is through the plane of the wheels, and is therefore not liable to strain the vehicle.

The compartments C may be in the roof or under the seats, so long as they leave a longitudinal passage-way and are located to the sides of the car and in the plane of the wheels. In the case of the roof compartments the doors D may open on the roof. It is also evident that the battery-cells B may be supported on removable bottoms G, which may hold the contacts $b$, against which the door-contacts $d$ press, as shown at the lower part of Fig. 2.

F is the electric motor, and Q is the motor-circuit connecting the motor and battery, and may have suitable regulating devices.

The electric motor F is mechanically connected with the axles, so as to propel the car, and is partly or wholly supported thereon. The battery-cells B on each side of the car are connected by circuits Q with the motor F, and a single regulating device, S, for controlling the current passing to the motor, may be located in the circuit Q. The motor may be supported and connected to the axles, if desired, in the manner set out in my applications Serial Nos. 240,880 and 224,150, of 1887, or Serial No. 214,309, of 1886.

Z is a signal-circuit connecting with the poles of one cell of battery B, and includes an electric bell, Z', and a circuit maker and breaker, $z$, which may be operated by a cord, $z'$, passing into the car. While one cell would be amply sufficient, more cells could be employed, if so desired.

A resistance-changer, Y, may be employed to regulate the current (when the battery is fully charged) that passes over the signal-circuit Z.

In this application I do not claim any of the specific features claimed when combined with an electric motor supported independently upon the axles, nor the arrangement of the batteries on springs, as these form subject-matter of my application Serial No. 240,880, of 1887, hereinbefore referred to.

Having now described my invention, what I claim as new, and desire to secure by Letters Patent, is—

1. The combination of a vehicle having a compartment on its roof and an electric battery located therein.

2. The combination of a vehicle having a compartment on each side of its roof and an electric battery located in each compartment.

3. The combination of a vehicle having a compartment on its roof, an electric battery located therein, and a door to open or close said compartment.

4. The combination of a vehicle having a compartment, a removable battery consisting of separate cells located therein, a door or cover to close said compartment, and circuit-closing devices controlled by the door or cover to couple up the cells of the battery when the door or cover is closed.

5. The combination of a vehicle having a compartment, a removable battery consisting of cells located therein and having contact projections, a hinged door or cover to close said compartment, and circuit-closing spring devices controlled by the door or cover to touch said contact projections and couple up the cells of the battery when the door or cover is closed.

6. The combination of a car or vehicle, a battery arranged upon its roof or upper part, an electric motor arranged upon its lower part, and connecting-circuits between said battery and motor.

7. The combination of a compartment supported on axles by means of springs, a removable door or cover to said compartment, removable secondary battery-cells in said compartment, a circuit-closing device carried by the door or cover to couple up the battery into working connection, an electric motor to propel the compartment, and conductors connecting the battery and motor.

8. The combination of a traveling vehicle having battery-compartments arranged upon each side of the vehicle and over the wheels, and secondary batteries located within said compartments, whereby the weight thereof shall be located in the plane of the wheels, avoiding excessive strains to the car or vehicle frame.

9. The combination of a traveling vehicle having battery-compartments arranged upon each side of the vehicle and over the wheels, a passage-way located longitudinally through the vehicle and having its floor below the top of the batteries and between the battery-compartments, and secondary batteries located within said compartments, whereby the weight thereof shall be located in the plane of the wheels, avoiding excessive strains to the vehicle-frame.

10. The combination of a traveling vehicle having battery-compartments arranged upon each side of the vehicle and over the wheels, and secondary batteries located within said compartments, whereby the weight thereof shall be located in the plane of the wheels, avoiding excessive strains to the vehicle-frame, an electric motor to propel the vehicle, a mechanical connection between the motor and axle, and an electric circuit connecting the motor and both batteries.

11. The combination of an electrically-propelled vehicle, an electric motor to propel said vehicle, a secondary battery composed of a series of cells connected in series to supply current to said motor, a signal-circuit including one cell of the battery, a resistance and an electric bell in said circuit, and a circuit-maker to make or break said signal-circuit.

12. The combination of a compartment supported on axles by means of springs, a movable door or cover to said compartment, a series of removable battery-cells on said compartment, an electric motor directly connected to the axles and supported thereon, and conductors connecting the battery and motor.

13. The combination of a car, an electric motor to propel it, a battery on said car, consisting of a large number of cells connected in series with the motor, an electric signal on the car, a circuit including the said electric signal and a small part of the battery employed for the motor, and a switch to control the current flowing over said signal-circuit.

In testimony of which invention I hereunto set my hand.

RUDOLPH M. HUNTER.

Witnesses:
ERNEST HOWARD HUNTER,
HENRY DRURY.